US006351094B1

(12) United States Patent
Green (10) Patent No.: US 6,351,094 B1
(45) Date of Patent: Feb. 26, 2002

(54) CONTROL OF SWITCHED RELUCTANCE MACHINES

(75) Inventor: Charles Edward Brandon Green, St. Louis, MO (US)

(73) Assignee: Switched Reluctance Drives, Ltd., Harrogate (GB)

( * ) Notice: Subject to any disclaimer, the term of this patent is extended or adjusted under 35 U.S.C. 154(b) by 0 days.

(21) Appl. No.: 09/503,411

(22) Filed: Feb. 14, 2000

(30) Foreign Application Priority Data

Feb. 15, 1999 (GB) ............................................. 9903401

(51) Int. Cl.$^7$ ................................................ H02P 1/46
(52) U.S. Cl. ...................... 318/701; 318/254; 318/700; 318/439
(58) Field of Search ................................ 318/254, 701, 318/700, 439

(56) References Cited

U.S. PATENT DOCUMENTS

| 4,772,839 | A | * | 9/1988 | MacMinn et al. | 318/696 |
| 5,107,195 | A | * | 4/1992 | Lyons et al. | 318/701 |
| 5,467,025 | A | * | 11/1995 | Ray | 324/772 |
| 5,525,886 | A | * | 6/1996 | Lyons et al. | 318/701 |
| 5,652,494 | A | * | 7/1997 | Sugden | 318/701 |
| 5,811,954 | A | * | 9/1998 | Randall | 318/701 |
| 5,859,518 | A | * | 1/1999 | Vitunic | 318/701 |
| 5,867,004 | A | * | 2/1999 | Drager et al. | 318/701 |
| 6,008,615 | A | * | 12/1999 | Sugden | 318/701 |

FOREIGN PATENT DOCUMENTS

EP 0 573 198 12/1993

OTHER PUBLICATIONS

Ray et al., "Sensorless Methods For Determining The Rotor Position Of Switched Reluctance Motors" PROC EPE '93 Conference, Brighton, UK, Sep. 13–16, 1993, vol. 6, pp. 7–13.

Stephenson et al., "The Characteristics, Design and Application of Switched Reluctance Motors and Drives" PCIM '93, Nürnberg, Jun. 21–24, 1993.

Mvungi, et al., "A New Sensorless Position Detector for SR Drives" Proc PEVD Conf., IEE Publication No. 324, London, Jul. 17–19, 1990, pp. 249–252.

Press et al., "Numerical Recipes in C", Cambridge University Press, 1988, pp. 204–209.

Lyons, J.P. et al., "Flux/Current Methods for SRM Rotor Position Estimation" Proceedings of the Industry Applications Society Annual Meeting, U.S., New York, IEEE, 1991, pp. 482–487.

* cited by examiner

Primary Examiner—Marlon T. Fletcher
Assistant Examiner—Rina I. Duda
(74) Attorney, Agent, or Firm—Dicke, Billig & Czaja, P.A.

(57) ABSTRACT

A switched reluctance drive includes a reluctance machine, a controller, power switches actuated by the controller and a current transducer for monitoring the current in each phase winding. The controller employs a sensorless rotor position detection technique by injecting voltage pulses into the idle period of each phase winding in a chopping mode. Acoustic noise associated with the injected pulses is concealed by varying the frequency at which the pulses are injected according to rotor speed. In an alternative embodiment the frequency is varied pseudo-randomly.

20 Claims, 8 Drawing Sheets

Fig 1

Prior Art

Prior Art

Fig 4(b)

Prior Art

CONTROL OF SWITCHED RELUCTANCE MACHINES

BACKGROUND OF THE INVENTION

1. Field of the Invention

The present invention relates to the control of switched reluctance machines, particularly those machines which are operated without a sensor to measure rotor position.

2. Description of Related Art

In general, a reluctance machine is an electrical machine in which torque is produced by the tendency of its movable part to move into a position where the reluctance of a magnetic circuit is minimized, i.e. where the inductance of the exciting winding is maximized. In one type of reluctance machine, the energization of the phase windings occurs at a controlled frequency. This type is generally referred to as a synchronous reluctance machine, and it may be operated as a motor or a generator. In a second type of reluctance machine, circuitry is provided for detecting the angular position of the rotor and energizing the phase windings as a function of the rotor position. This second type of reluctance machine is generally known as a switched reluctance machine and it may also be operated as a motor or a generator. The characteristics of such switched reluctance machines are well known and are described in, for example, "The characteristics, design and application of switched reluctance motors and drives" by Stephenson and Blake, PCIM'93, Nürnberg, Jun. 21–24, 1993, incorporated herein by reference. That paper describes in some detail the features of the switched reluctance machine which together produce the characteristic cyclically varying inductance of the phase windings.

Figure 1:
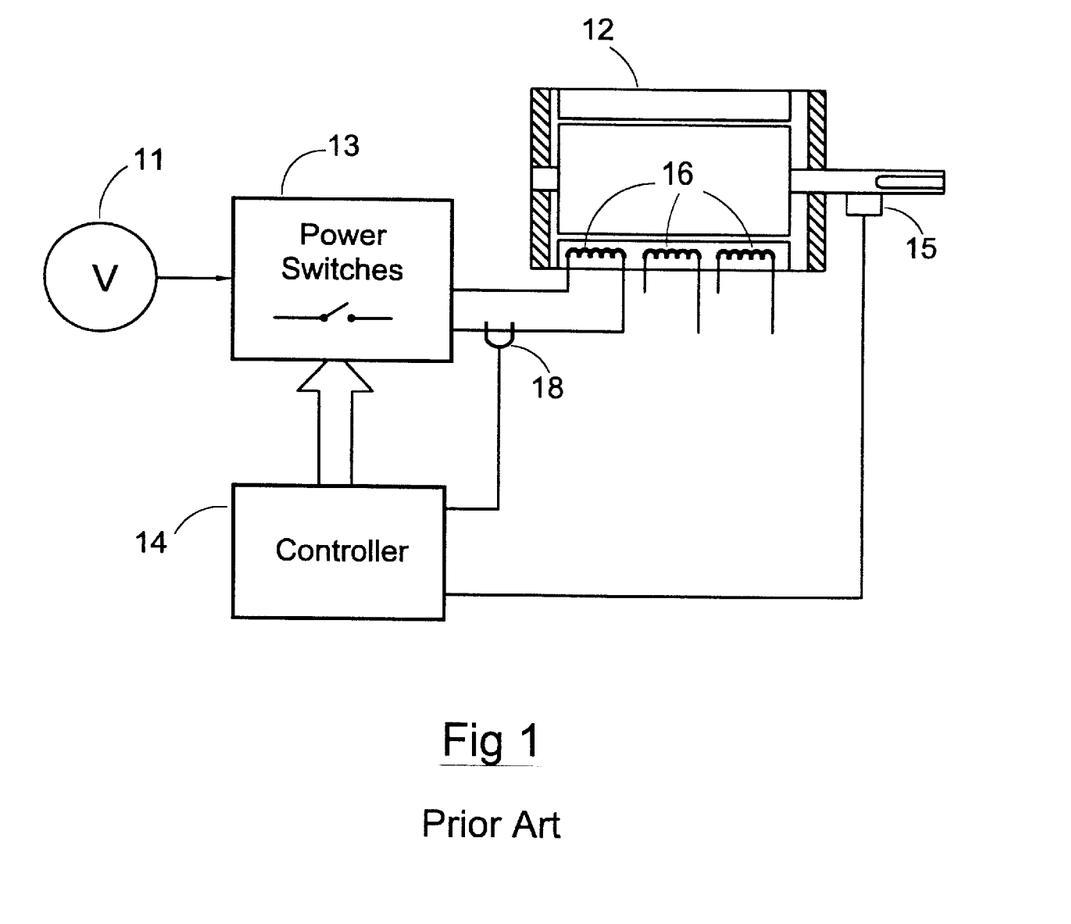
FIG. 1 shows the principal components of a conventional switched reluctance drive system.

FIG. 1 shows the principal components of a typical switched reluctance drive system. The input DC power supply 11 can be either a battery or a rectified and filtered AC supply and can be fixed or variable in magnitude. In some known drives, the power supply 11 includes a resonant circuit which produces a DC voltage which rapidly varies between zero and a predetermined value to allow zero voltage switching of the power switches. The DC voltage provided by the power supply 11 is switched across the phase windings 16 of the motor 12 by a power converter 13 under the control of the electronic control unit 14. The switching must be correctly synchronized to the angle of rotation of the rotor for proper operation of the drive. A rotor position detector 15 is typically employed to supply signals indicating the angular position of the rotor. The output of the rotor position detector 15 may also be used to generate a speed feedback signal.

The rotor position detector 15 may take many forms, for example it may take the form of hardware, as shown schematically in FIG. 1. In other systems, the position detector can be a software algorithm which calculates or estimates the position from other monitored parameters of the drive system. These systems are often called "sensorless position detector systems" since they do not use a physical transducer associated with the rotor which measures the position. As is well known in the art, many different approaches have been adopted in the quest for a reliable sensorless system. Some of these approaches are discussed below.

Figure 2:
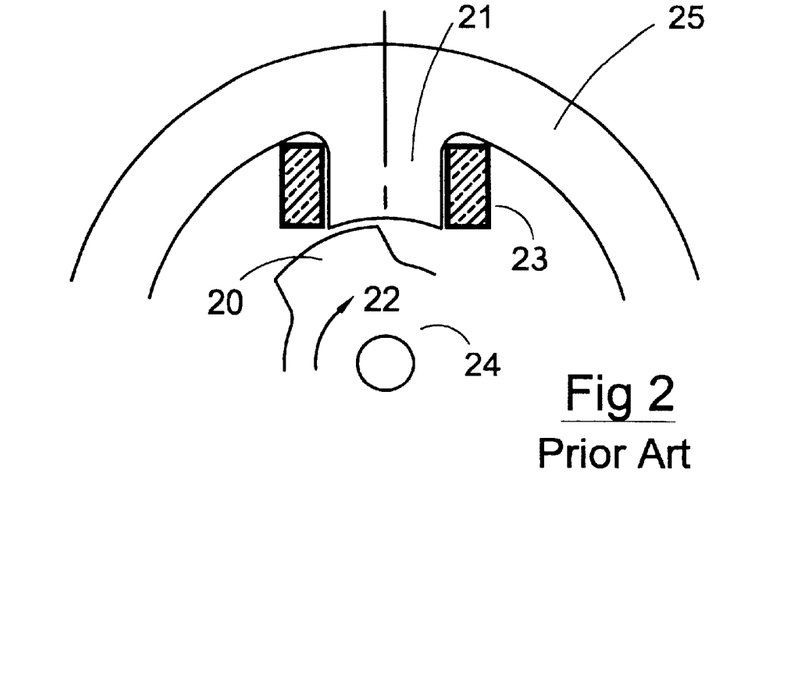
FIG. 2 shows a schematic diagram of a rotor pole approaching a stator pole.
Figure 3:
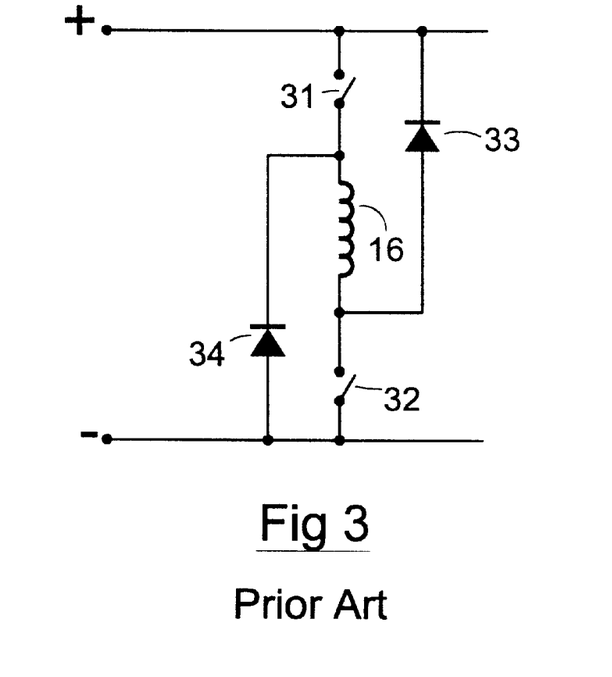
FIG. 3 shows typical switching circuitry in a power converter that controls the energization of the phase windings of the machine of FIG. 1.

The energization of the phase windings in a switched reluctance machine depends on detection of the angular position of the rotor. This may be explained by reference to FIGS. 2 and 3, which illustrate the switching of a reluctance machine operating as a motor. FIG. 2 generally shows a rotor 24 with a rotor pole 20 approaching a stator pole 21 of a stator 25 according to arrow 22. As illustrated in FIGS. 2 and 3, a portion 23 of a complete phase winding 16 is wound around the stator pole 21. When the portion 23 of the phase winding 16 around stator pole 21 is energized, a force will be exerted on the rotor, tending to pull rotor pole 20 into alignment with stator pole 21. FIG. 3 generally shows typical switching circuitry in the power converter 13 that controls the energization of the phase winding 16, including the portion 23 around stator pole 21. When switches 31 and 32 are closed, the phase winding is coupled to the source of DC power and is energized. Many other configurations of lamination geometry, winding topology and switching circuitry are known in the art: some of these are discussed in the Stephenson & Blake paper cited above. When the phase winding of a switched reluctance machine is energized in the manner described above, the magnetic field set up by the flux in the magnetic circuit gives rise to the circumferential forces which, as described, act to pull the rotor poles into line with the stator poles.

Figure 4A:
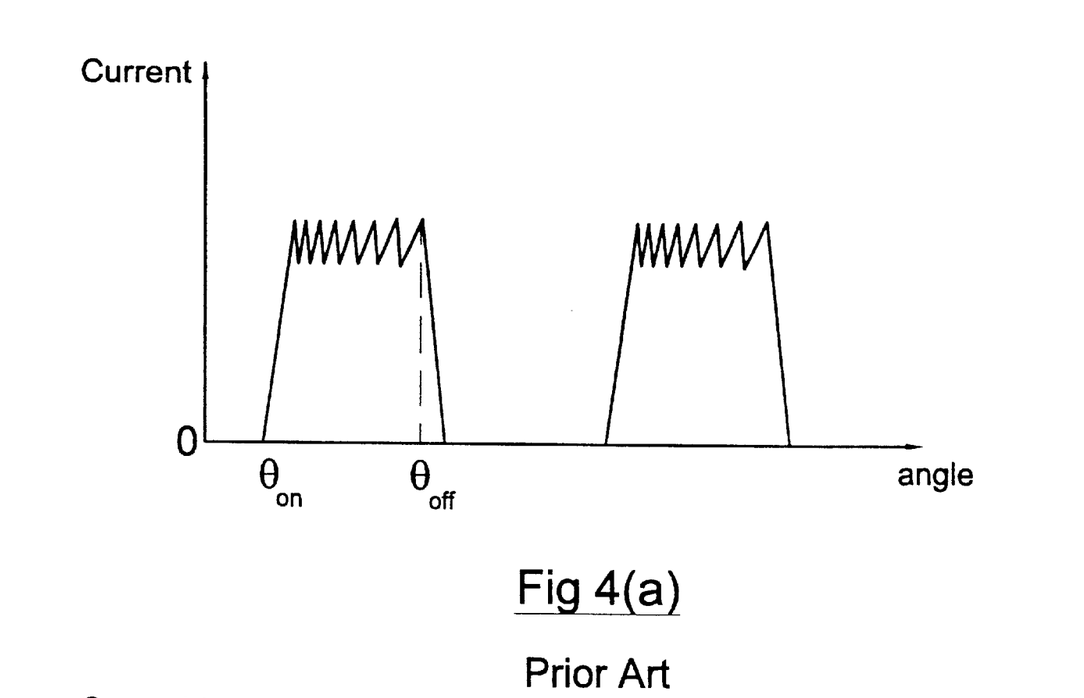
FIGS. 4(a) and 4(b) illustrate typical current waveforms of a switched reluctance drive operating in chopping and single-pulse modes respectively.

In general, the phase winding is energized to effect the rotation of the rotor as follows. At a first angular position of the rotor (called the "turn-on angle", $\theta_{ON}$), the controller 14 provides switching signals to turn on both switching devices 31 and 32. When the switching devices 31 and 32 are on, the phase winding is coupled to the DC bus, causing an increasing magnetic flux to be established in the machine. The magnetic flux produces a magnetic field in the air 10 gap which acts on the rotor poles to produce the motoring torque. The magnetic flux in the machine is supported by the magneto-motive force (mmf) which is provided by a current flowing from the DC supply through the switches 31 and 32 and the phase winding 23. Current feedback is generally employed and the magnitude of the phase current is controlled by chopping the current by rapidly switching one or both of switching devices 31 and/or 32 on and off. FIG. 4(a) shows a typical current waveform in the chopping mode of operation, where the current is chopped between two fixed levels. In motoring operation, the turn-on angle $\theta_{ON}$ is often chosen to be the rotor position where the center-line of an inter-polar space on the rotor is aligned with the center-line of a stator pole, but may be some other angle.

In many systems, the phase winding remains connected to the DC bus (or connected intermittently if chopping is employed) until the rotor rotates such that it reaches what is referred to as the "freewheeling angle", $\theta_{FW}$. When the rotor reaches an angular position corresponding to the freewheeling angle (e.g., the position shown in FIG. 2) one of the switches, for example 31, is turned off. Consequently, the current flowing through the phase winding will continue to flow, but will now flow through only one of the switches (in this example 32) and through only one of the diodes 33/34 (in this example 34). During the freewheeling period, the voltage drop across the phase winding is small, and the flux remains substantially constant. The circuit remains in this freewheeling condition until the rotor rotates to an angular position known as the "turn-off angle", $\theta_{OFF}$, (e.g. when the center-line of the rotor pole is aligned with that of the stator pole). When the rotor reaches the turn-off angle, both switches 31 and 32 are turned off and the current in phase winding 23 begins to flow through diodes 33 and 34. The diodes 33 and 34 then apply the DC voltage from the DC bus in the opposite sense, causing the magnetic flux in the machine (and therefore the phase current) to decrease. It is known in the art to use other switching angles and other current control regimes.

Figure 4B:
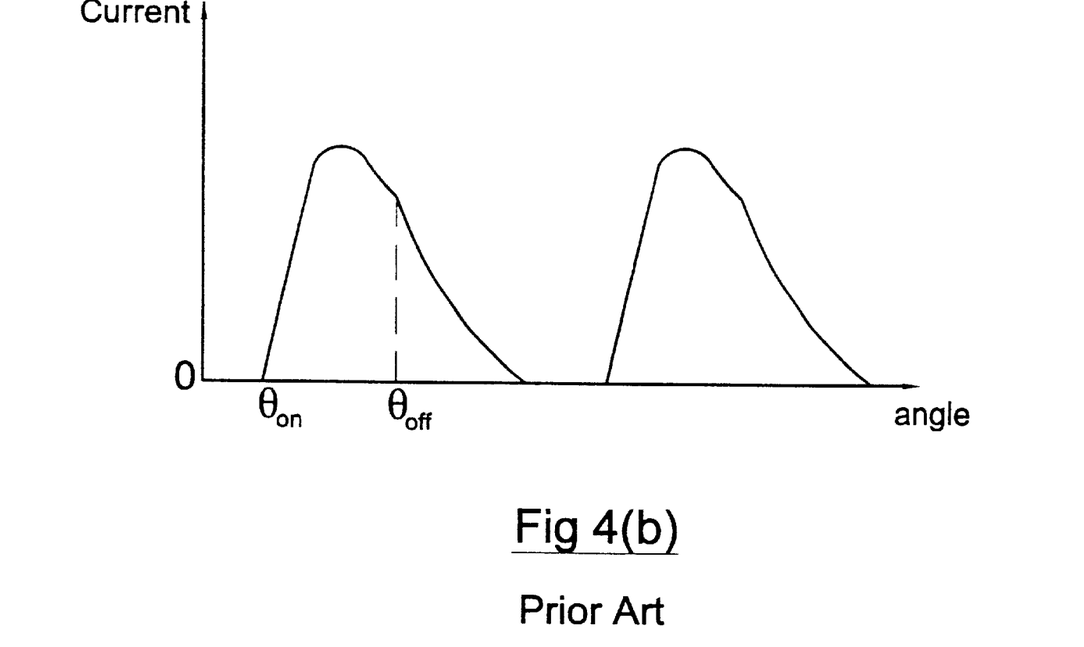

As the speed of the machine rises, there is less time for the current to rise to the chopping level, and the drive is normally run in a "single-pulse" mode of operation. In this mode, the turn-on, freewheel and turn-off angles are chosen as a function of, for example, speed and load torque. FIG. 4(b) shows a typical such single-pulse current waveform where the freewheel angle is zero. It is well known that the values of turn-on, freewheel and turn-off angles can be predetermined and stored in some suitable format for retrieval by the control system as required, or can be calculated or deduced in real time.

Many sensorless position detection systems are reviewed and categorized in "Sensorless methods for determining the rotor position of switched reluctance motors", Ray et al, Proc EPE'93 Conference, Brighton, UK, Sep. 13–16, 1993, Vol. 6, pp. 7–13, which is incorporated herein by reference. The authors describe methods which are suitable for operation in the chopping mode or in the single-pulse mode. Most of the methods which are suitable for operation in the chopping mode use diagnostic pulses of some sort which are injected into an idle phase winding. By monitoring the result of these pulses, the control system is able to estimate the rotor position and hence determine when the main excitation should be applied to and removed from the phase windings.

One well-known implementation of this approach is described in "A new sensorless position detector for SR drives" by Mvungi et al, Proc PEVD Conf, IEE Pub'n No 324, London, Jul. 17–19, 1990, pp. 249–252, which is incorporated herein by reference. This uses a region of the rotor cycle when the phase would otherwise be idle. Pulses are injected at a frequency which is high compared to the rotor speed—the paper suggests a frequency of 3.3 kHz is possible for the power switches being used. This appears to be a trade-off between loss in the switches and the desire to obtain as much position information as is possible during the window of opportunity when the phase is not required to contribute to torque production.

However it has been found with such systems that the injection of the pulses into the machine causes acoustic noise at the frequency of injection due to the distortion of the stator in the presence of the forces created by the pulse. The frequencies required are typically in the range 1–4kHz, a region where the human ear is particularly sensitive. The net result is that in such sensorless systems, there may be an audible buzz at the pulse injection frequency which may be found objectionable.

SUMMARY OF THE INVENTION

It is an object of this invention to provide a sensorless position detection method for a switched reluctance drive which has reduced noise emission. Embodiments of the present invention are generally applicable to switched reluctance machines operating as motors or generators.

According to an embodiment of the invention there is provided a switched reluctance drive comprising a reluctance machine having a rotor, a stator and at least one phase winding, a controller for controlling the output of the machine and means for injecting diagnostic pulses into at least one of the phase windings for rotor position detection, the controller being operable to determine the position of the rotor relative to the stator according to an effect of the diagnostic pulses and to actuate the means for injecting according to a variable frequency to reduce the perceived noise emitted from the drive.

Embodiments of the invention allow the buzz associated with the diagnostic pulses to be concealed within other events associated with the switching of the reluctance machine. The energy actually associated with the pulses may not be reduced, but the perception is that they have been removed. Thus, the operation of the machine becomes less objectionable to the human ear.

Embodiments of the invention may be arranged to vary the frequency in relation to rotor speed or it may be randomly variable. Pseudo-random frequency hopping could be used.

The pulses are preferably injected in an idle period of the or each phase. The pulses are also preferably voltage pulses.

To take account of the need to operate the machine at low speeds, a lower limit is preferably placed on the rotor speed at which the pulse frequency is made variable in accordance with rotor speed. Similarly, it is also desirable to impose an upper threshold on the variability of the pulse frequency with rotor speed. Furthermore, the transition between constant frequency and frequency variable with rotor speed may be made gradual to avoid any abrupt change between the two.

Embodiments of the invention also extend to a method of reducing the noise emitted from a switched reluctance machine comprising: controlling the output of the machine by the energization of the phase windings according to the position of the rotor relative to the stator; injecting diagnostic pulses into at least one of the windings; determining the rotor position from the effect of the diagnostic pulses; and varying the frequency of the pulses to reduce the perceived noise emitted from the machine.

BRIEF DESCRIPTION OF THE DRAWINGS

The invention can be put into practice in a number of ways, some of which will now be described by way of example with reference to the accompanying drawings, in which.

DETAILED DESCRIPTION OF PREFERRED EMBODIMENTS

Figure 5:
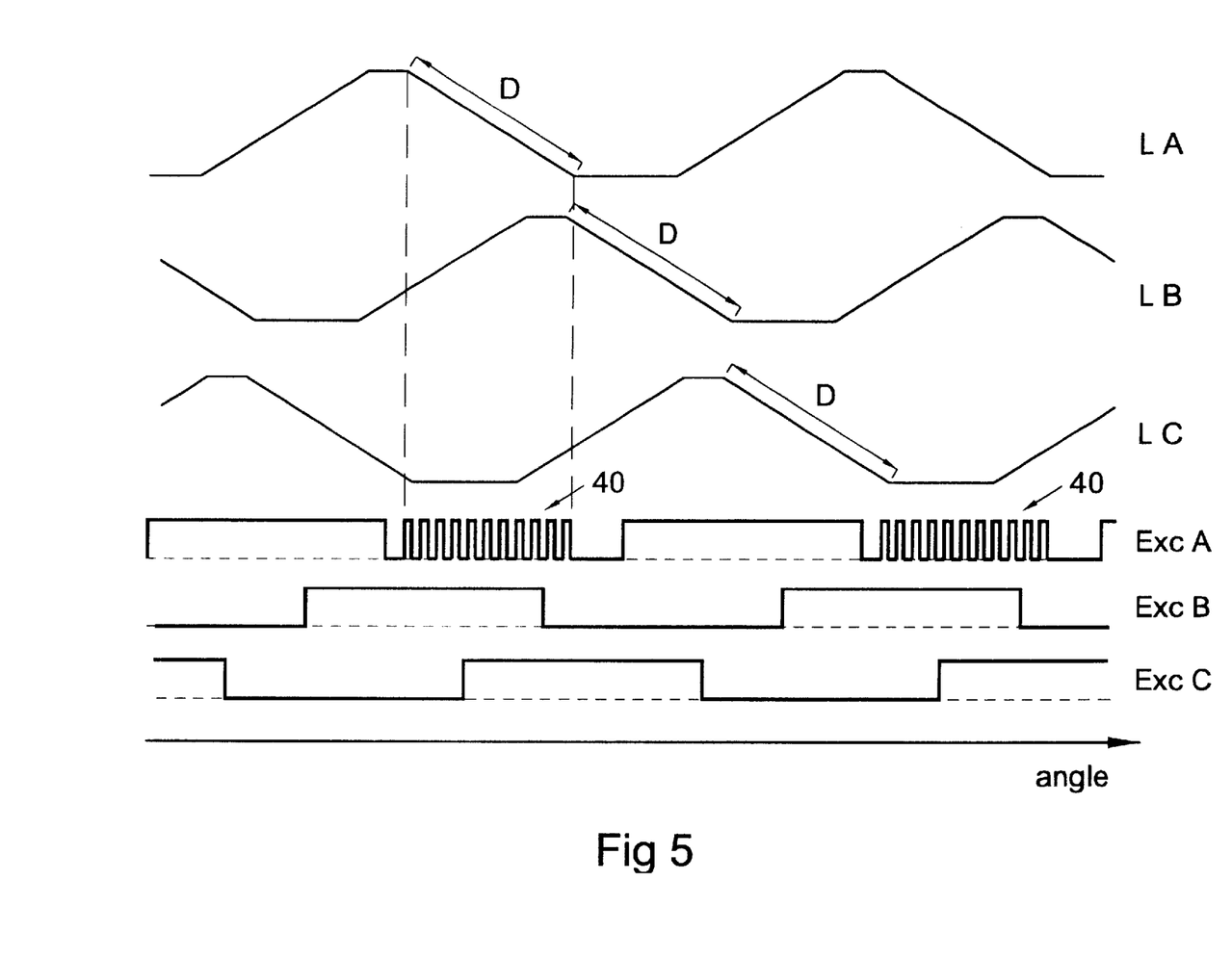
FIG. 5 shows the idealized inductance profiles and possible pulse injection regions for a machine operated according to an embodiment of the invention.

As described above, when a switched reluctance machine is operated in chopping mode at very low speeds (either motoring or generating), the excitation is typically applied to each phase winding in turn for half the period of the cyclical inductance variation, as shown schematically in FIG. 5 for motoring operation. When the phase is not being excited in order to produce torque in the required direction, it is in its so-called "idle" mode and it is possible to use this period of time to interrogate the phase by injecting diagnostic pulses and measuring some parameter of the response. For example, by using the power switching available for controlling the machine to apply voltage pulses to each idle phase, the winding current can be monitored. The current is a function of the position of the rotor poles relative to the stator poles and, from this, the rotor angle can be derived from a look-up table. The pulses are typically injected by briefly closing the main switches for that phase, e.g. 31 and 32 in FIG. 3.

Figure 6A:
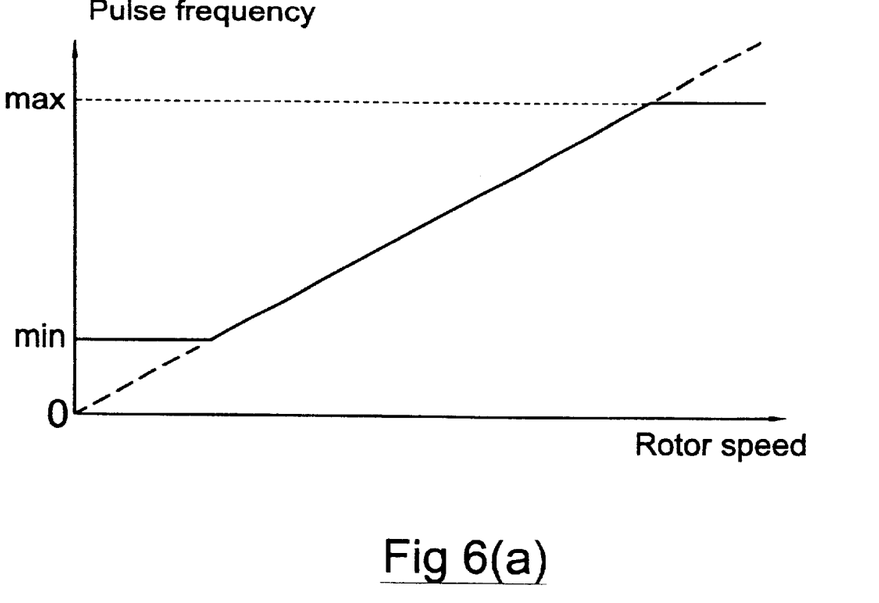
FIGS. 6(a) and 6(b) show possible relationships between the diagnostic pulse frequency and the rotor speed for a control system operated according to an embodiment of the invention.
Figure 6B:
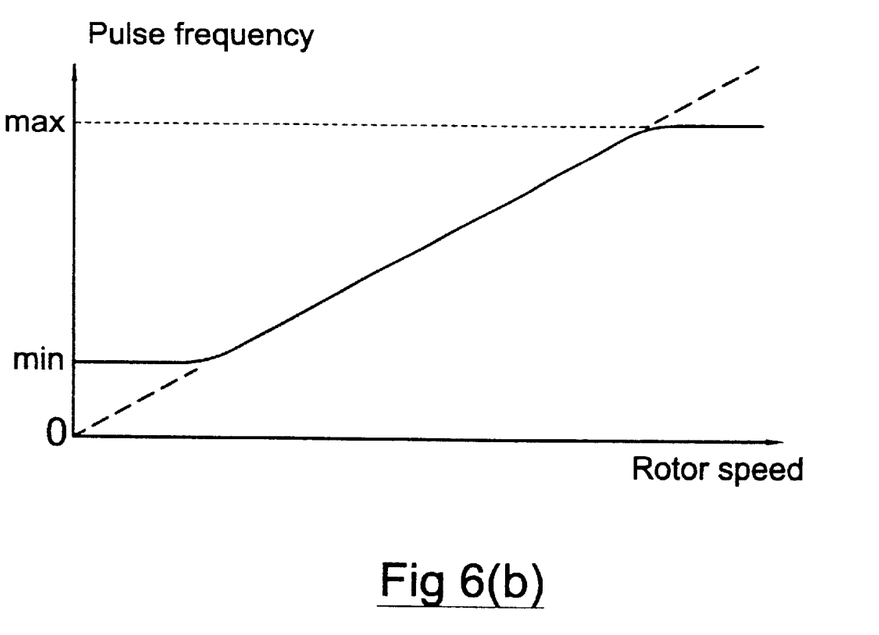

One embodiment of the invention achieves quiet running of the motor by selecting the frequency of the diagnostic pulses to be a multiple of the rotor speed. A series of pulses 40 injected at a particular frequency for a given rotor speed is illustrated in FIG. 5 for the idle mode of phase A. This is illustrative only. Each phase will preferably include a number of diagnostic pulses in each idle mode for a more complete and regular assessment of rotor position to be made. The number of pulses required for stable machine control is discussed below. Clearly there are limits to the range of diagnostic pulse frequency. If the rotor speed tended towards zero and the pulse rate were proportionately reduced, the rate of information would also tend to zero and control of the system would be lost. At the other end of the range, if the rotor speed were very high, the switching rate required for the pulses might be outside the capability of the switches or the processing speed of the processor, or the associated switching loss might be excessive. It is therefore preferable to lock the diagnostic pulse frequency to the rotor speed only over a predetermined speed range. This is shown in FIG. 6($a$), where the diagnostic pulse frequency varies between chosen minimum and maximum bounds, and is directly proportional to rotor speed within these bounds. FIG. 6($b$) shows a modification of this where there is a smooth transition of the pulse frequency from a fixed frequency to one changing with rotor speed at the upper and lower frequency bounds to avoid abrupt changes in frequency as the rotor passes through the beginning and the end of the range in which pulse frequency changes with rotor speed. This modification may be beneficial in some drives.

It has been found that the lower bound is the more important in practice, since the top speed at which the machine is run in chopping is generally modest. A preferred system for a 3-phase machine uses a minimum frequency of 600 Hz, blending into a frequency which is 2.5 times rotor speed above a threshold of 400 rev/min. In the portion of the graph of FIG. 6($a$) or ($b$) with a linear non-zero rate of change with rotor speed a typical pulse frequency per unit of rotor speed would be 2.5 for a 3-phase machine having a rotor with 8 poles and a stator with 12 poles.

Figure 7:
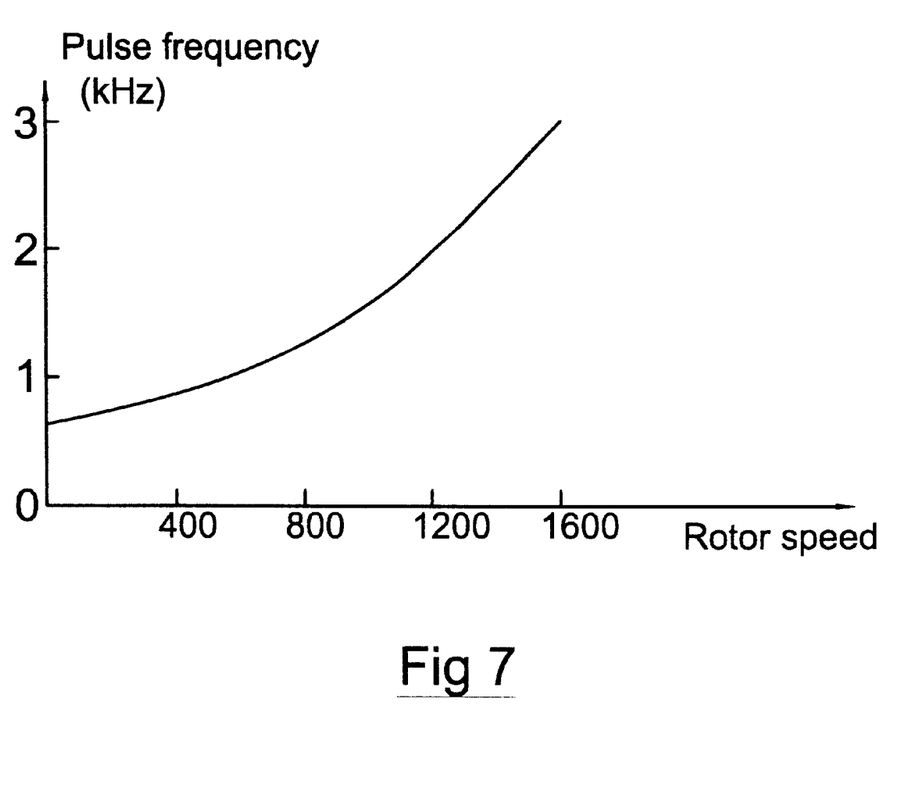
FIG. 7 shows an approximation to the relationships in FIG. 6 which can be easily generated in a microprocessor.

An alternative relationship between pulse frequency and rotor speed is shown in FIG. 7. This is generated from the expression:

$$\text{Pulse rate} = 10^7/(15000 - 7.156\, \omega) \quad (1)$$

where $\omega$ is the rotor speed in rev/min. The constants used in equation (1) were derived for a three phase, twelve stator pole/eight rotor pole reluctance machine. It will be appreciated by the skilled person that the constants could be suitably varied for other machine arrangements. The generalized formula from the above expression is:

$$\text{Pulse rate} = A/(B - C\omega)$$

The expression can be readily evaluated by, for example, a microprocessor in the control system of the machine and the result fed to a pulse generation circuit.

Figure 8:
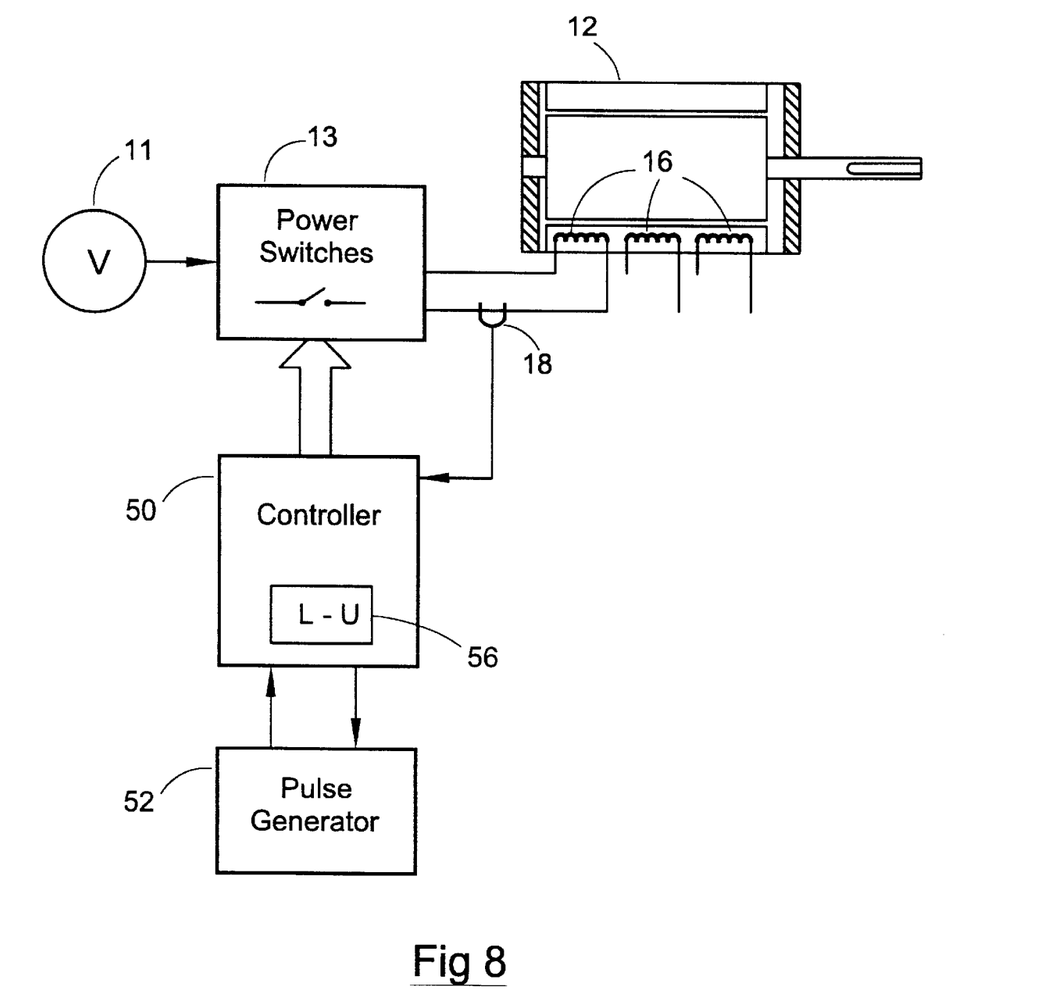
FIG. 8 is a schematic block diagram of an embodiment of the invention.

An example of a switched reluctance drive in which any of these embodiments of the invention can be implemented is illustrated in FIG. 8. Those components having like parts as the conventional drive in FIG. 1 are given like reference numerals. They will not be described further here. Since the drive uses sensorless rotor position detection, it will be noted that the rotor position transducer 15 of FIG. 1 has been removed.

The current transducer 18 provides a reading of the current in one of the windings 16 to a controller 50. Similar transducers arranged in relation to the others of the three phases would be provided on an actual machine.

As part of the control regime, while the machine is running the controller 50 will compute a value for the rotor speed conventionally from rotor position information. When the next phase (say phase A) into which the diagnostic pulses are to be injected is determined to be in its idle mode, the controller 50 applies the current rotor speed value to a pulse frequency generator 52 which responds with a pulse frequency value for that speed according to FIGS. 6($a$), ($b$) or FIG. 7. The pulse frequency generator may take any one of a number of forms, but in this embodiment is a look-up table in which pulse frequency values are addressed using rotor speed as the ordinate. Another form is processor-based real-time calculation. The pulse frequency value is used by the controller 50 to configure the output of a pulse generator according to the pulse frequency. The output of the pulse generator determines the period between pulses and, at the points in time so determined, the controller actuates the switches appropriate to phase A to inject diagnostic pulses into the phase A windings. The resultant current is sensed by the current transducer 18 and the rotor position is then computed by the controller as referred to above using the look-up table 56 in which rotor angle values are stored for co-ordinates of current and flux.

The controller and function generator are shown as discrete components in FIG. 8. It will be appreciated by the skilled person that a convenient implementation of this embodiment would be in the form of an application specific integrated circuit (ASIC) or a microprocessor which will incorporate various of these functions in software to the same end.

In the embodiments of the invention described above, the diagnostic pulses are still of the magnitude which would have been used on a prior art system, and though it would be expected that the stator deformation due to these pulses would be the same as before, linking the timing of the occurrence of the pulses to the dominant noise-producing events in the cycle (for example making the frequency of the pulses a multiple of the frequency of those events) has the effect of masking the noise associated with the diagnostic pulses. The net result is that the machine is perceived to be significantly quieter.

An alternative embodiment of this invention uses a pseudo random modulation on the frequency of diagnostic pulses. By choosing a base frequency, say around 2.5 kHz, the period between successive pulses may be modulated so that there is no constant frequency of acoustic noise presented to an observer. This is a form of frequency hopping across a bandwidth. The pulse frequency may be modulated in a number of ways, but for an economic solution the computation involved should be relatively simple and fast. A particular embodiment which meets these requirements makes use of a mathematical function which gives pseudo random numbers within a range:

$$\text{ran} = (\text{ran} * A + B)/C \quad (2)$$

This function is taken from pages 204–209 of "Numerical Recipes in C" by Press et al, published by Cambridge University Press, 1988, incorporated by reference herein. By using appropriate values for the constants (e.g. A=967, B=3041 and C=14406) the function produces integers uniformly distributed in time over the range 0 to 14405.

The period between successive pulses is then modulated by applying the random numbers:

$$Period=ran/D+E \quad (3)$$

Suitable selection of values for the integers D and E will vary the period relative to the base frequency. For example with a base frequency of 2.67 kHz, using D=8 and E=2850 varies the effective frequency from 2.15 to 3.51 kHz, whereas using D=16 and E=2850 yields a higher frequency band of 2.67 to 3.5 1 kHz.

Those skilled in the art will appreciate that the availability of the five integers A to E gives a very flexible system which can be tailored very easily to a particular application.

Figure 9:
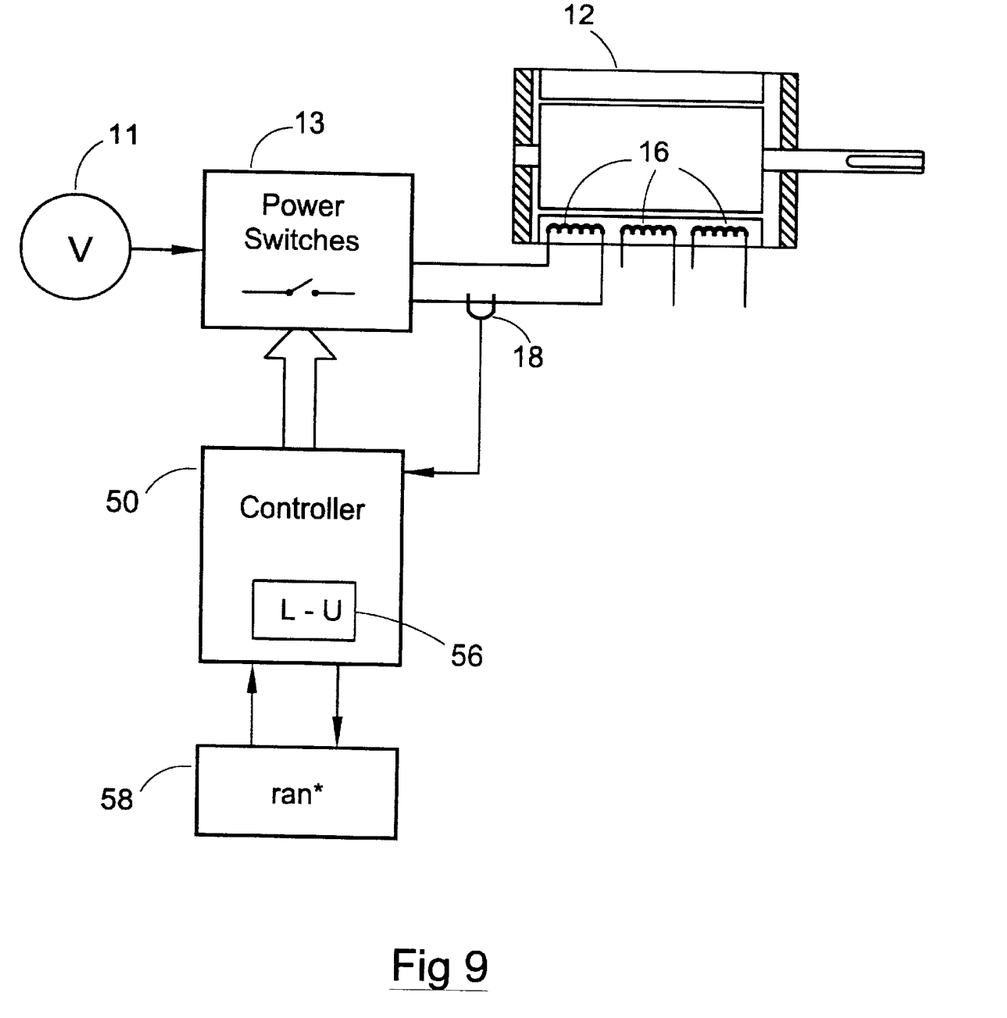
FIG. 9 is a schematic block diagram of an embodiment of the invention.

FIG. 9 illustrates an example of a switched reluctance drive in which the pseudo-randomly varying pulse frequency embodiments of the invention can be put into effect. As with FIG. 1 and FIG. 8, like components are given like reference numerals.

The controller 50 controls energization of the phase windings by actuation of the switches for each phase. In the idle mode of one of the phases, the controller accesses a random number generator 58 which produces the values of the periods by which the diagnostic pulses of voltage will be randomly spaced. As before, current generated as a result of each pulse is sensed by the current transducer 18 from which the controller is able to determine rotor position.

As with any rotating machine, speed fluctuations are most likely at low speeds (since the rotor inertia acts as an increasingly effective damper as the speed rises). Thus, at the lower speeds for which this invention is best suited, it is better to take as many readings as possible to maximize the accuracy of the rotor position detection technique that is used. Therefore, it is desirable to fill the idle mode as far as possible with pulses and to use each idle mode for each phase in turn. The rotor position detection technique used can be chosen from one of the many described in the articles referred to above. Commonly, though not exclusively, these will involve injection of a known voltage pulse having a rectangular shape. However, pulses of current or flux could be used instead. Similarly, the shape of the pulse, while characteristically rectangular, could be of another shape, for example triangular.

Though the number of pulses that could occur in a diagnostic (idle) period is clearly tied to the speed of the rotor, it is necessary for stable control to set a minimum limit on the number of pulses used in any one diagnostic period. Typically a minimum value of 3 pulses is required for a 3-phase machine operating at around 1400 rev/min. This is achieved with the illustrative values given above.

The process of determining the pulse frequency does not have to be dependent on rotor speed in this embodiment. However, it may be advantageous to arrange the frequency variation into bands within each of which the variation is random. Each band is then applicable to a range of rotor speed with the center frequency of the band increasing with rotor speed.

The description of various embodiments of the invention is in terms of the machine while running. Start-up is another matter. It is addressed, for example, in the paper by Ray and Al-Bahadly referred to above. In the technique they describe, initial rotor position is determined by exciting a pair of phases in a polyphase machine and deriving the appropriate phase to excite from a correlation between the results of the diagnosis in both phases.

It will be realized that, while the above examples have been described in relation to a three-phase machine, the invention can be applied to any polyphase switched reluctance machine with any number of poles and operating in either the motoring or generating mode. Similarly, the invention could be applied to a linear machine where the moving part (often referred to as a "rotor") travels linearly. Thus, the skilled person will appreciate that variation of the disclosed arrangements are possible without departing from the invention. Accordingly, the above description of several embodiments is made by way of example and not for the purposes of limitation. The present invention is intended to be limited only by the spirit and scope of the following claims.

What is claimed is:

1. A switched reluctance drive comprising a reluctance machine having a rotor, a stator and at least one phase winding, a controller for controlling output of the machine and means for injecting diagnostic pulses into the at least one phase winding for rotor position detection, the controller being operable to determine the position of the rotor relative to the stator according to an effect of the diagnostic pulses and to actuate the means for injecting according to a variable frequency to reduce the perceived noise emitted from the drive, wherein the controller is operable to actuate the means for injecting (a) to inject a first series of diagnostic pulses, the first series having a first time period between each pulse of the first series, and (b) to inject a second series of diagnostic pulses, the second series having a second time period between each pulse of the second series, the first time period being different than the second time period, the machine continuously running during and between injection of the first and second series of diagnostic pulses.

2. A drive as claimed in claim 1 in which the controller is operable to vary the frequency of the pulses with rotor speed.

3. A drive as claimed in claim 2 in which the controller is operable to vary the frequency in direct proportionality to rotor speed.

4. A switched reluctance drive comprising a reluctance machine having a rotor, a stator and at least one phase winding, a controller for controlling output of the machine and means for injecting diagnostic pulses into the at least one phase winding for rotor position detection, the controller being operable to determine the position of the rotor relative to the stator according to an effect of the diagnostic pulses and to actuate the means for injecting according to a variable frequency to reduce the perceived noise emitted from the drive, wherein the controller is operable to vary the frequency of the pulses above a lower threshold of rotor speed.

5. A drive as claimed in claim 4 in which the control is operable to vary the frequency below an upper threshold of rotor speed.

6. A switched reluctance drive comprising a reluctance machine having a rotor, a stator and at least one phase winding, a controller for controlling output of the machine and means for injecting diagnostic pulses into the at least one phase winding for rotor position detection, the controller being operable to determine the position of the rotor relative to the stator according to an effect of the diagnostic pulses and to actuate the means for injecting according to a variable frequency to reduce the perceived noise emitted from the drive, wherein the controller is operable to vary the frequency of the pulses with rotor speed, further wherein the rotor is operable to vary the frequency according to the formula:

Pulse frequency=A/(B−Cω)

where ω is the rotor angular speed and A, B and C are constants.

7. A switched reluctance drive comprising a reluctance machine having a rotor, a stator and at least one phase winding, a controller for controlling output of the machine and means for injecting diagnostic pulses into the at least one phase winding for rotor position detection, the controller being operable to determine the position of the rotor relative to the stator according to an effect of the diagnostic pulses and to actuate the means for injecting according to a variable frequency to reduce the perceived noise emitted from the drive, further wherein the controller is operable to vary the frequency of the pulses pseudo-randomly.

8. A drive as claimed in claim 7 in which the controller is operable to vary the frequency of the pulses between an upper and a lower frequency limit.

9. A drive as claimed in claim 1 in which the controller is arranged to inject a plurality of pulses into the winding during an idle period.

10. A drive as claimed in claim 1 in which the means for injecting is operable to inject a voltage pulse.

11. A method of reducing the noise emitted from a switched reluctance machine having a rotor and a stator, the method comprising:

controlling output of the machine by the energization of at least one phase winding of the machine according to the position of the rotor relative to the stator;

injecting diagnostic pulses into the at least one winding;

determining the rotor position from an effect of the diagnostic pulses; and varying the frequency of the diagnostic pulses to reduce the perceived noise emitted from the machine, including (a) injecting a first series of diagnostic pulses, the first series having a first time period between each pulse of the first series, and (b) injecting a second series of diagnostic pulses, the second series having a second time period between each pulse of the second series, the first time period being different than the second time period, the machine continuously running during and between injection of the first and second series of diagnostic pulses.

12. A method as claimed in claim 11 in which the frequency of the pulses is varied with rotor speed.

13. A method as claimed in claim 12 in which the frequency of the pulses is varied directly proportionally with rotor speed.

14. A method of reducing the noise emitted from a switched reluctance machine having a rotor and a stator, the method comprising:

controlling output of the machine by the energization of at least one phase winding of the machine according to the position of the rotor relative to the stator;

injecting diagnostic pulses into the at least one winding;

determining the rotor position from an effect of the diagnostic pulses; and varying the frequency of the pulses to reduce the perceived noise emitted from the machine;

wherein the frequency of the pulses is varied directly proportionally with rotor speed;

further wherein the frequency of the pulses is varied according to the formula:

Pulse frequency=A/(B−Cω)

where ω is the rotor speed and A, B and C are constants.

15. A method of reducing the noise emitted from a switched reluctance machine having a rotor and a stator, the method comprising:

controlling output of the machine by the energization of at least one phase winding of the machine according to the position of the rotor relative to the stator;

injecting diagnostic pulses into the at least one winding;

determining the rotor position from an effect of the diagnostic pulses; and varying the frequency of the pulses to reduce the perceived noise emitted from the machine;

wherein the pulse frequency is varied above a predetermined lower threshold of rotor speed.

16. A method as claimed in claim 15 in which the pulse frequency is varied below a predetermined upper threshold of rotor speed.

17. A method of reducing the noise emitted from a switched reluctance machine having a rotor and a stator, the method comprising:

controlling output of the machine by the energization of at least one phase winding of the machine according to the position of the rotor relative to the stator;

injecting diagnostic pulses into the at least one winding;

determining the rotor position from an effect of the diagnostic pulses; and varying the frequency of the pulses to reduce the perceived noise emitted from the machine;

wherein the pulse frequency is varied pseudo-randomly.

18. A method as claimed in claim 17 in which the pulse frequency is varied between an upper and a lower frequency.

19. A method as claimed in claim 11 in which the plurality of pulses are injected into the winding during an idle period.

20. A switched reluctance drive comprising a reluctance machine having a rotor, a stator and at least one phase winding, a controller for controlling output of the machine and for causing injection of diagnostic pulses into the at least one phase winding for rotor position detection, the controller being operable to determine the position of the rotor relative to the stator according to an effect of the diagnostic pulses and to cause the injection of pulses according to a variable frequency to reduce the perceived noise emitted from the drive, wherein the controller is operable to cause (a) injection of a first series of diagnostic pulses, the first series having a first time period between each pulse of the first series, and (b) injection of a second series of diagnostic pulses, the second series having a second time period between each pulse of the second series, the first time period being different than the second time period, the machine continuously running during and between injection of the first and second series of diagnostic pulses.

* * * * *